United States Patent
Cato

(10) Patent No.: US 6,928,343 B2
(45) Date of Patent: Aug. 9, 2005

(54) SHOPPER TRACKER AND PORTABLE CUSTOMER SERVICE TERMINAL CHARGER

(75) Inventor: Robert Thomas Cato, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 7 days.

(21) Appl. No.: 10/630,462

(22) Filed: Jul. 30, 2003

(65) Prior Publication Data

US 2005/0027443 A1 Feb. 3, 2005

(51) Int. Cl.$^7$ .......................... G06F 13/00; G06F 15/21
(52) U.S. Cl. ...................... 701/24; 701/216; 340/5.91; 340/568.5; 705/16; 705/20; 705/26; 705/29
(58) Field of Search ........................... 701/24, 25, 216; 340/5.91, 568.5, 870.07, 870.16, 870.2; 705/16, 20, 23, 26, 29, 400

(56) References Cited

U.S. PATENT DOCUMENTS

| | | | |
|---|---|---|---|
| 5,072,956 A | 12/1991 | Tannehill et al. | 280/33.992 |
| 5,287,266 A | 2/1994 | Malec et al. | 705/1 |
| 5,295,064 A * | 3/1994 | Malec et al. | 705/1 |
| 5,406,271 A | 4/1995 | Sonnendorfer et al. | 340/5.91 |
| 5,491,670 A | 2/1996 | Weber | 367/127 |
| 5,821,513 A | 10/1998 | O'Hagan et al. | 235/383 |
| 6,725,206 B1 * | 4/2004 | Coveley | 705/414 |
| 6,774,503 B1 * | 8/2004 | Chen | 290/1 R |

FOREIGN PATENT DOCUMENTS

| | | |
|---|---|---|
| CA | 2249114 | 4/2000 |
| FR | 2785055 | 4/2000 |
| JP | 61082287 | 4/1986 |
| WO | 0173710 | 10/2001 |

* cited by examiner

Primary Examiner—Thomas G. Black
Assistant Examiner—Arthur D Donnelly
(74) Attorney, Agent, or Firm—Sawyer Law Group LLP; Jeanine Ray-Yarletts

(57) ABSTRACT

A system and method is disclosed for a shopping system, the system including a shopping cart including a plurality of wheels; a portable electronic device (e.g., a CST or POS terminal), coupled to the shopping cart, for displaying shopping data; and a position mapping system, coupled to the electronic device, for developing a shopper location relative to a start location, the mapping system including a distance measuring system, coupled to one of the plurality of wheels; for providing a distance signal indicating a distance of movement of the shopping cart; and a direction measuring system for providing a direction signal concurrent with the distance signal. Another embodiment is a shopper tracking system including a shopping cart having a plurality of wheels; a portable electronic device, coupled to the shopping cart, for displaying shopping data; and an energy generator, coupled to one of the plurality of wheels, for adding energy to a power source of the portable electronic device. The shopper tracking method includes the steps of measuring a net distance traveled by a shopping cart and measuring direction information concurrently with the distance information to produce a relative location that is offset from a known location and converting the relative location to an absolute coordinate by providing absolute coordinates for the known location.

20 Claims, 3 Drawing Sheets

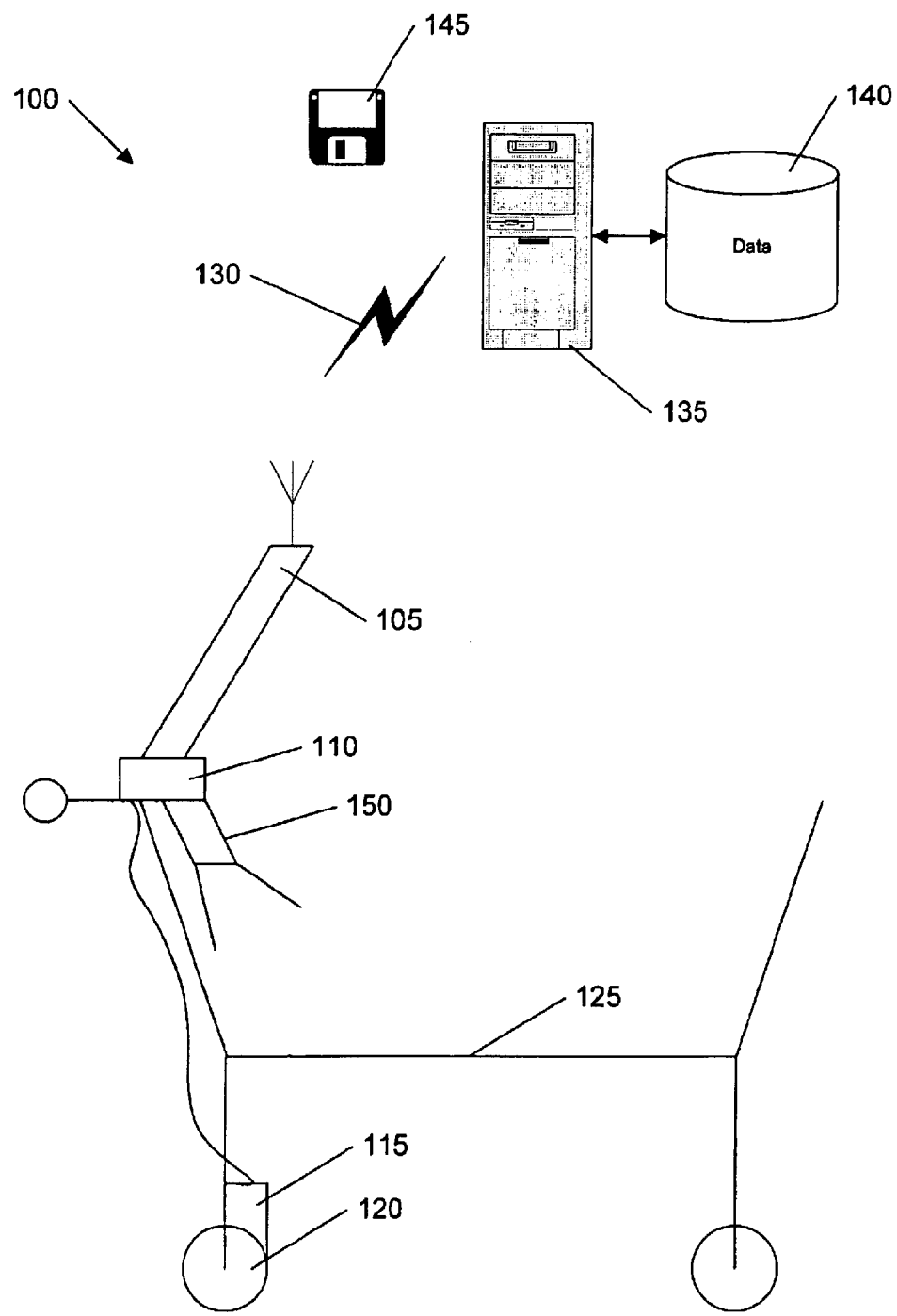
Figure_1

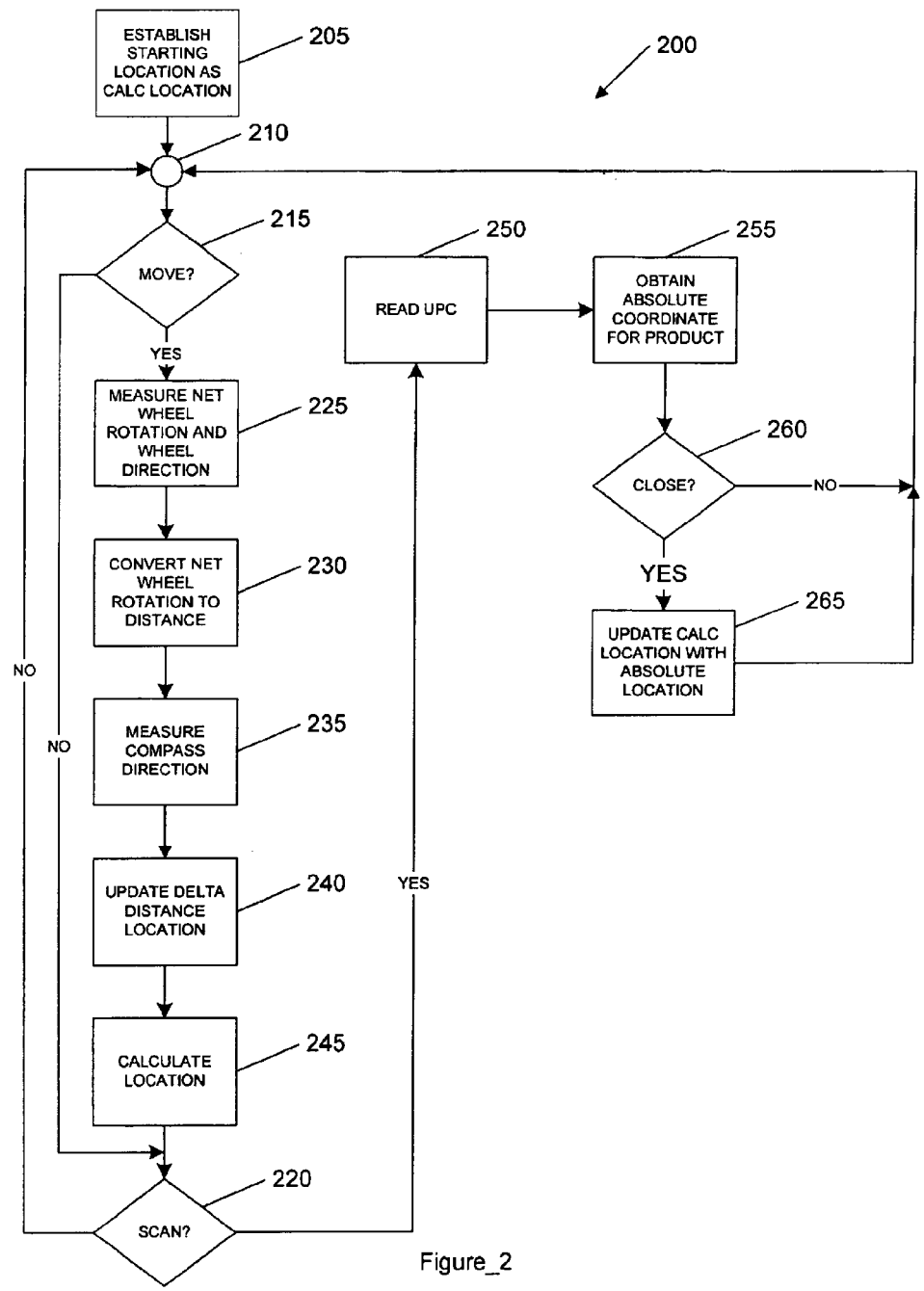
Figure_2

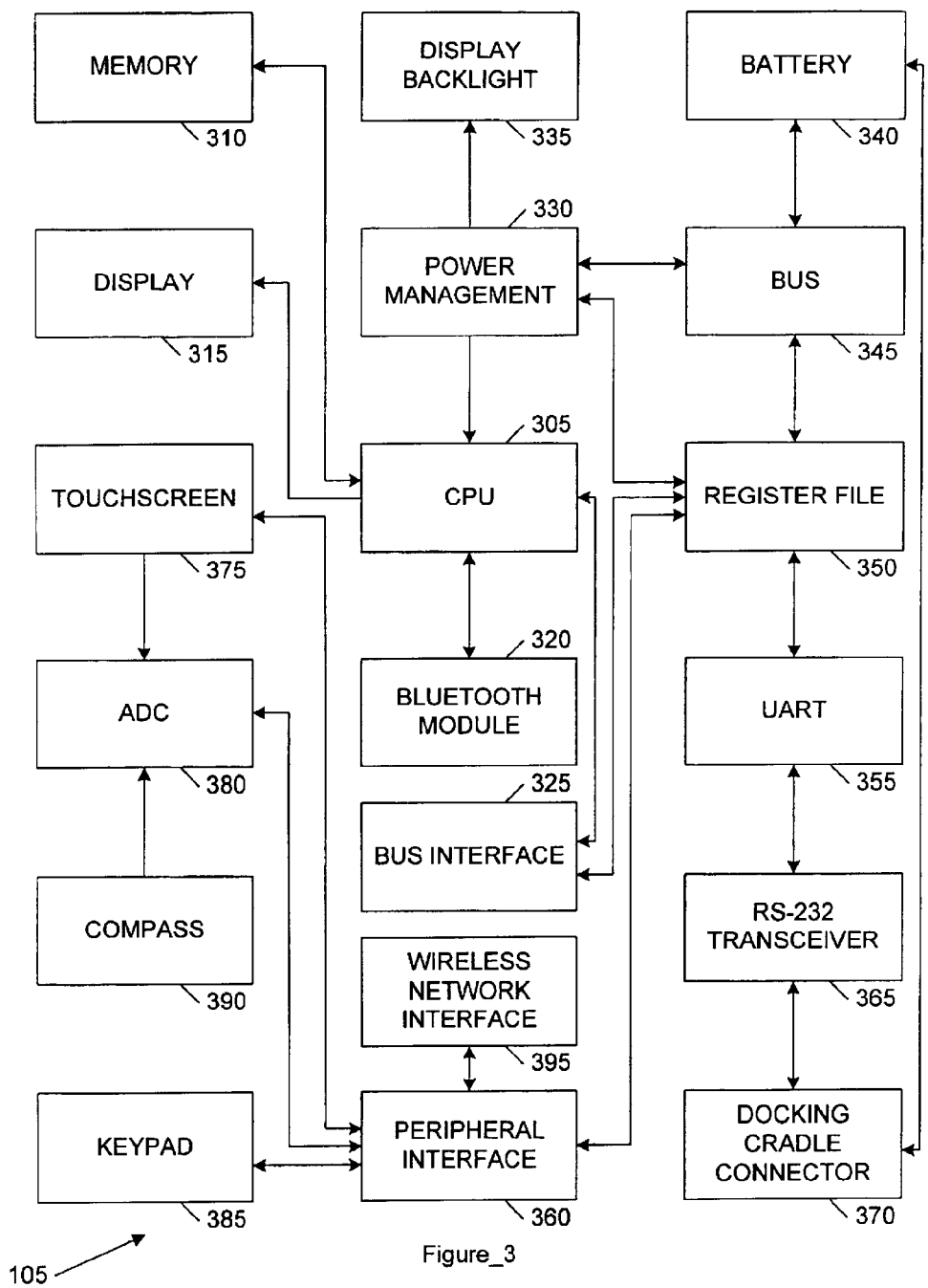
Figure_3

SHOPPER TRACKER AND PORTABLE CUSTOMER SERVICE TERMINAL CHARGER

FIELD OF THE INVENTION

The present invention relates generally to shopper tracking systems, and more specifically to a shopper tracking system for retrofit addition to an existing shopping location having reduced infrastructure improvement requirements.

BACKGROUND OF THE INVENTION

It is known to provide shopper-tracking systems to use in locating a shopper within a shopping location. Shopper tracking systems typically employ portable electronic devices such as, for example, customer service terminals (CSTs) or portable point-of-sale (POS) terminals that display sales and marketing information to the shopper, and may in some cases allow the user to tabulate and purchase items without passing through a stationary checkout location.

There are many advantages to knowing a shopper's current location as well as the path that the shopper walked in reaching the particular location. Among these advantages are special retail options available to the shopper near the current location may be easily presented on the portable device, and directions may be provided the shopper for moving to a desired product's location when the shopper's present location is known.

Shopper-tracking systems that rely on triangulation with various beacons installed throughout the shopping establishment to pinpoint a shopper's location do exist. Such systems require an infrastructure investment to install and maintain the multitude of beacons. Other systems locate a shopper by use of a universal product code (UPC) scanner incorporated into the portable device. When the shopper scans the UPC barcode, the system locates the shopper in the shopping establishment where such products are available for selection. Such a system cannot track a precise shopping path taken by the user, and it does not know the shopper's location absent the user scanning a UPC code.

Accordingly, what is needed is a method and system for easily tracking a shopper's current location as the shopper moves through a store without requiring installation of wireless location systems for triangulation or constant scanning of merchandise. The present invention addresses such a need.

SUMMARY OF THE INVENTION

A system and method is disclosed for a shopping system, the system including a shopping cart including a plurality of wheels; a portable electronic device (e.g., a CST or POS terminal), coupled to the shopping cart, for displaying shopping data; and a position mapping system, coupled to the electronic device, for developing a shopper location relative to a start location, the mapping system including a distance measuring system, coupled to one of the plurality of wheels; for providing a distance signal indicating a distance of movement of the shopping cart; and a direction measuring system for providing a direction signal concurrent with the distance signal. Another embodiment is a shopper tracking system including a shopping cart having a plurality of wheels; a portable electronic device, coupled to the shopping cart, for displaying shopping data; and an energy generator, coupled to one of the plurality of wheels, for adding energy to a power source of the portable electronic device. The shopper tracking method includes the steps of measuring a net distance traveled by a shopping cart and measuring direction information concurrently with the distance information to produce a relative location that is offset from a known location and converting the relative location to an absolute coordinate by providing absolute coordinates for the known location.

The present invention tracks a shopper's current location as the shopper moves about a store without requiring installation of wireless location systems for triangulation or constant scanning of merchandise that the shopper passes during the shopping trip.

BRIEF DESCRIPTION OF THE DRAWINGS

FIG. 1 is a schematic block diagram of a preferred embodiment for a shopper tracking system;

FIG. 2 is a process flowchart of the preferred embodiment for the shopper tracking system; and FIG. 3 is a generic block diagram of a portable electronic device of the type that may be used as described in FIGS. 1–2.

DETAILED DESCRIPTION

The present invention relates to tracking a shopper's current location as the shopper moves about a store without requiring installation of wireless location systems for triangulation or constant scanning of merchandise, and in some implementations providing a recharging platform for a portable electronic device, such as for example a customer service terminal (CST) or a portable point-of-sale (POS) terminal. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the sales environment, systems and applications are being developed to permit a customer to carry a portable electronic device with them as they walk through an establishment. To simplify the following discussion, a preferred type of portable electronic device (the CST) will be specifically referred to, though the present invention may be used with many types of portable electronic devices having the functions described below. The CST may provide sales or marketing information to the customer as they move about the establishment. An internal battery that requires periodic recharging typically powers the CST. It is part of the preferred embodiment to adapt the shopper tracking system to include a recharging function for such devices when they are being used.

FIG. 1 is a schematic block diagram of a preferred embodiment for a shopper tracking system 100. System 100 includes a portable electronic device 105 engaged with a cradle 110 coupled to a generator 115 driven by a wheel 120 of a shopping cart 125. Additionally, system 100 may also include a communications system 130 coupled to a computing system 135 having a merchandise database 140, computing system 135 operable in response to instructions stored on a non-volatile removable medium, represented by disk 145. A merchandise reader 150, coupled to cradle 110 reads merchandise identification information used to access database 140.

Device 105 of the preferred embodiment is a special purpose computing platform having a microprocessor or microcontroller coupled to memory, input/output (I/O) devices, direct memory access, timers and other supporting hardware, firmware, and software to determine and display appropriate information to a shopper and to implement the particular functions for the shopper and the retail establishment. There are many general purpose and special purpose devices available that could be modified for use in the present invention, as well as new devices that are introduced into the marketplace. For example, customer service terminals (CSTs), personal digital assistants (PDAs), tablet PCs, webpads, portable point-of-sale (POS) terminals may all be suitable for use as device 105. Device 105 includes a compass function, either embedded or available as an added function, for producing a direction signal for use by device 105 as further described herein. Additionally, electronic device 105 typically includes one or more batteries for powering its operation and functions.

Cradle 110 is a docking cradle for device 105 and exchanging power and signals between other components of system 100 and device 105. In some implementations, device 105 may be permanently engaged with cradle 110, or removably coupled. In some embodiments, some of the features of the present invention may be unavailable while device 105 is removed from cradle 110.

Generator 115 of the preferred embodiment provides both power for recharging rechargeable batteries of device 105, and a net movement distance signal to device 105 through cradle 110. The distance signal is a composite of the number of whole or partial rotations of wheel 120 and the direction of those rotations. By knowing the circumference of wheel 120, device 105 is able to know the net distance cart 125 has moved from one calculation cycle to another.

Device 105 combines the distance signal with the concurrently available direction signal from the compass function to track a series of path vectors of cart 125 as a shopper moves about the retail establishment. The total of these path vectors define a shopper's relative location at each moment, the location being relative to various origins of the path vector components. Device 105 of the preferred embodiment includes a calibration function to map a beginning origin path vector component of the series of path vectors to an absolute location. This in turn allows device 105 to determine a shopper's absolute location at any time, with the series of path vectors defining the shopper's path. Additionally, as the shopper moves throughout the store, generator 115 continually recharges the batteries of device 105 extending the time that each device 105 may be used.

Reader 150 and computing system 135 are used to help refine the shopper's location indicated by the path vector calculations. The user may periodically scan merchandise to retrieve merchandise identification information as part of the normal shopping/marketing/sales function of device 105. For example, reader 150 may be a bar code reader for reading universal product code (UPC) information available on many grocery store products. Other types of sales locations may use different types of merchandise identification information, possibly requiring use of a different type of reader 150.

This scanning may be done for obtaining price, nutrition information or other data about the product, for example. Device 105 is able to query database 140 by transmitting the UPC to computing system 135 using wireless transmission system 130 (e.g., radio frequency, ultrasonic or infrared communications) and receive absolute coordinates for the scanned product. Device 105 may update the calculated location using the product location information to more accurately position the shopper. To account for mis-shelved products, device 105 may ignore product location information having too large of a distance delta from the calculated location.

FIG. 2 is a flowchart of the preferred embodiment for a process 200 of the shopper tracking system 100. Process 200 determines a system's starting location at step 205. Step 205 establishes an absolute starting location for a particular system 100 by, for example, scanning an item with a known absolute location. Thereafter, process 200 waits at node 210 for information that may be used to update the system's present location.

Process 200 responds, in the preferred embodiment, to two types of location updating data: movement of system 100 and absolute location updating data. In response to an update indication, or expiration of a timer, process 200 advances to step 215 from node 210 to test whether system 100 has moved. If the test is negative, process 200 advances to step 220 to test whether location-updating data may be available. If the test at step 220 is negative, process 200 returns to node 210 to wait for a next event.

When the test at step 215 is positive, indicating movement of cart 125, process 200 advances to step 225 to measure a net wheel rotation. Generator 115 provides both an indication of the direction of wheel rotation, and the number of whole or partial rotations in the particular direction. The information may be provided over a data channel separate from the power channel, or the data may be superimposed on the power signal. At step 225, process 200 determines the net number of whole or partial rotations of wheel 120. Next, process 200 at step 230 converts the rotation information into a distance. The conversion may be done by knowing/calculating the circumference of wheel 120. This number is the magnitude of a path vector component for movement of cart 125.

Next at step 235, process 200 measures the direction cart 125 is pointing when the distance signal from step 225 and step 230 is being generated. The cart direction signal is preferably an output from the compass function included as part of device 105. In some embodiments, two or more encoders included in wheels of cart 125 may be compared to provide the cart direction signal. In some embodiments, one or more wheels of cart 125 are pivotally coupled to the cart and could provide a cart direction signal to device 105 through cradle 110. The cart direction signal is the direction information for the path vector component.

After generating the distance signal at step 230 and the cart direction signal at step 235, process 200 advances to step 240 to update the shopper's delta distance location using the path vector component produced from the direction signal and the distance signal. The end point of the path vector component, when added to the previous path vector component, relatively locates the shopper in the shopping center.

After step 240, process 200 calculates the shopper's current absolute location at step 245 by applying a known absolute coordinate to the origin of the initial path vector component (the known absolute coordinate is available from step 205 in the preferred embodiment).

Device 105 of the preferred embodiment has a calibration feature to enter the absolute coordinates of one of the origins of the path vector components. For example, when a shopper passes over a certain landmark, the shopper could activate a button associated with that landmark to assign a predetermined absolute location to the origin of one of the path vectors. Thereafter, knowing the relative movement from the landmark, and knowing the absolute location of the landmark positively locates absolute coordinates for the shopper. After step 245, process 200 goes to step 220. Step 220 is also reached when the test at step 215 is negative, meaning the cart has not moved.

Step 220 determines when a bar code is scanned and reader 150 is active. When the test at step 220 is positive, process 200 advances to step 250 from step 220.

Step 250 uses reader 150 to obtain merchandise identification information, in this case the UPC. Next, process 200 advances to step 255 to obtain absolute coordinate information for the identified merchandise. System 100 does this by using computer system 135 to query database 140 using the UPC and retrieving the absolute location of the identified merchandise. Process 200 tests the absolute location of the identified merchandise against the calculated location available using the current summation of the location vector components. In step 260, process 200 determines whether the calculated location is physically close (e.g., within some predetermined threshold) to absolute location data for the merchandise. If the test at step 260 is not close, process 200 does not update the calculated location with the merchandise absolute location and returns to node 210. For example, for a product that is not shelved in the proper location, the UPC may indicate a wrong location for the user, so system 105 rejects adjustments that exceed a predetermined threshold.

When the test at step 260 determines that the calculated location is physically close to the merchandise absolute location, process 200 at step 265 updates the calculated location using the absolute location for the read merchandise.

In some stores, computing system 135 may return a range of possible locations for the product and device 105 must discriminate among the data, or adjust the shopper only when the calculated location is within the proper range. In some implementations, device 105 may also transmit the calculated location and computing system 135 may return corrected information. In this embodiment, when device 105 has a unique identifier, computing system 135 may track and record the user's location rather than having device 105 store the entire path record. After step 265, process 200 returns to node 210 to monitor for possible changes to the shopper's location as described above. As long as the user is scanning, process 200 cycles through steps 220–265 for each scanned product.

FIG. 3 is a generic schematic diagram of device 105 of the type that may be used as described in FIGS. 1–2. Device 105 includes a central processing unit 305 that interfaces to memory 310, a display 315, a Bluetooth module 320, a bus interface 325 and a power management module 330. CPU 305 controls the operation of device 105 under instructions stored in memory 310 to implement process 200 as described above.

CPU 305 monitors power status from power management module 330, with power management module 330 controlling the state of a display backlight 335 and monitoring a status of a battery 340 through a bus (e.g., SMBus 345). CPU 305 controls operation of power management 330 and sends/receives data and/or control signals to other peripherals by use of a register file 350 coupled to bus interface 325. Register file 350 is additionally coupled to power management 330, bus 345, a universal asynchronous receiver-transmitter (UART) 355, and a peripheral interface 360 for interfacing information to CPU 305.

UART 355 is coupled to a RS-232 transceiver 365 that is coupled in turn to a docking cradle connector 370 included as part of cradle 110 shown in FIG. 1. Docking cradle 370 is also coupled to battery 340 when recharging is desired.

Peripheral interface 360 may be a serial peripheral interface or an inter-integrated circuit (I2C), for example, to interface to a touchscreen 375, an analog-digital converter (ADC) 380, or a keypad 385. In some applications, a compass 390 coupled to ADC 380 is used as described above, and device 105 uses a wireless network interface 395 to communicate to computing system 135.

The components of device 105 are but one example of a suitable configuration, with CPU 305 controlling operation and receiving information based upon instructions in memory 310. Memory 310 may be removable, and is preferably non-volatile. Other configurations of the components, or additional components may be used to configure a suitable device 105 to implement process 200.

In device 105, the distance signal is provided through docking cradle connector 370 and associated with the proper direction signal from compass 390. It is one feature of the present invention that device 105 may deactivate backlight 335 using power management module 330 during periods when the distance signal is below a particular threshold to conserve battery power. As also described above, compass function 390 may not be available internally, as direction data may be provided through cradle connector 370. Further, Bluetooth module 320 may provide broadcasts that may directly, or indirectly, provide location update information when passing close enough to the station without requiring the shopper to actively scan a product, or without installing extensive location systems throughout the shopping establishment.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A shopping system, comprising:
   a shopping cart including a plurality of wheels;
   a portable electronic device, coupled to the shopping cart, for displaying shopping data;
   a distance measuring system, coupled to one of the plurality of wheels, for providing a distance signal based on the movement of the wheel and indicating a distance of movement of the shopping cart; and
   an energy generator, coupled to one of the plurality of wheels, for adding energy to a power source of the portable electronic device.

2. A shopper tracking system, comprising:
   a shopping cart including a plurality of wheels;
   a portable electronic device, coupled to the shopping cart, for displaying shopping data; and
   a position mapping system, coupled to the portable electronic device, for developing a shopper location relative to a start location, the mapping system including
   a distance measuring system, coupled to one of the plurality of wheels, for providing a distance signal based on the movement of the wheel and indicating a distance of movement of the shopping cart; and
   a direction measuring system for providing a direction signal concurrent with the distance signal.

3. The shopper tracking system of claim 2 further comprising:
a position locating system, coupled to the portable electronic device, for entering absolute coordinates of the start location.

4. The shopper tracking system of claim 2 further comprising:
a merchandise reader, coupled to the portable electronic device, for detecting merchandise identification data from a merchandise element proximate the portable electronic device; and
a database, coupled to the portable electronic device, for storing absolute coordinate data for the merchandise element;
the portable electronic device using the absolute coordinate data of the merchandise element to adjust the shopper location.

5. The shopper tracking system of claim 4 wherein the merchandise reader is a bar code scanner and the merchandize identification data is a UPC bar code associated with the merchandise element.

6. The shopper tracking system of claim 4 wherein the database is remotely located relative to the portable electronic device and the portable electronic device is coupled to the database using a wireless transmission system.

7. The shopper tracking system of claim 4 wherein the database is written into a memory of the portable electronic device.

8. The shopper tracking system of claim 2 further comprising:
a merchandise reader, coupled to the portable electronic device, for detecting merchandise identification data from a merchandise element proximate the portable electronic devices,
wherein the portable electronic device uses stored absolute coordinate data associated with the merchandise element to adjust the shopper location.

9. The shopper tracking system of claim 2 wherein the portable electronic device enters a reduced power consumption mode when the distance measuring signal indicates that the shopping cart has not moved at least a first threshold distance within a second threshold period.

10. The shopping system of claim 1, wherein the distance measuring system and the energy generator are coupled to the same one of the plurality of wheels.

11. The shopping system of claim 1, wherein the distance measuring system indicates a distance of movement of the shopping cart by measuring a number of whole or partial rotations of the wheel to which the distance measuring system is coupled.

12. The shopper tracking system of claim 4 wherein the absolute coordinate data of the merchandise element is not used to adjust the shopper location if the absolute coordinate data designates a location that is more than a threshold distance away from the relative shopper location.

13. The shopping tracking system of claim 2 wherein the distance measuring system determines a distance by measuring a number of whole or partial rotations of the wheel to which the distance measuring system is coupled.

14. The shopping tracking system of claim 2 wherein the direction measuring system includes a direction-sensing device that provides the direction signal without the use of signals originating externally from the shopping cart.

15. The shopping tracking system of claim 2 wherein the direction measuring system measures a direction of movement of the shopping cart by using a compass function of the portable electronic device.

16. The shopping tracking system of claim 2 wherein the direction measuring system measures a direction of movement of the shopping cart by using a plurality of encoders coupled to at least one of the wheels of the shopping cart.

17. The shopping tracking system of claim 2 wherein at least one wheel of the shopping cart is pivotally coupled to the shopping cart and provides the direction signal.

18. A shopper tracking system, comprising:
a shopping cart including a plurality of wheels;
a portable electronic device, coupled to the shopping cart, for displaying shopping data; and
a position mapping system, coupled to the portable electronic device, the mapping system including
a relative positioning system, coupled to one of the plurality of wheels of the shopping cart, for determining the distance and direction the shopping cart has moved relative to a start location based on movement of the wheel, to determine the relative location of the shopping cart within a predetermined area, and
an absolute positioning system in communication with the portable electronic device for establishing an absolute position of the shopping cart within the predetermined area, wherein the absolute position is used to adjust the relative location of the shopping cart.

19. The shopper tracking system of claim 16, wherein the relative positioning system determines a distance by measuring a number of whole or partial rotations of the wheel to which the distance measuring system is coupled.

20. The shopper tracking system of claim 16, wherein the absolute positioning system includes:
a merchandise reader, coupled to the portable electronic device, for detecting merchandise identification data from a merchandise element proximate the portable electronic device; and
a database, coupled to the portable electronic device, for storing absolute position data for the merchandise element,
the portable electronic device using the absolute position data of the merchandise to adjust the location of the shopping cart.

* * * * *

Disclaimer

6,928,343 — Robert Thomas Cato, Raleigh, NC (US). SHOPPER TRACKER AND PORTABLE CUSTOMER SERVICE TERMINAL CHARGER. Patent dated August 9, 2005. Disclaimer filed October 5, 2006, by the assignee, International Business Machines Corporation.

Hereby enters this disclaimer to all of the claims, of said patent.

*(Official Gazette, May 27, 2008)*